(12) United States Patent
Kamada

(10) Patent No.: US 8,767,559 B2
(45) Date of Patent: Jul. 1, 2014

(54) DETERMINATION DEVICE, TRANSMISSION DEVICE, DETERMINATION METHOD, AND COMPUTER PROGRAM

(75) Inventor: Shinya Kamada, Tokyo (JP)

(73) Assignee: NEC Corporation, Tokyo (JP)

( * ) Notice: Subject to any disclaimer, the term of this patent is extended or adjusted under 35 U.S.C. 154(b) by 55 days.

(21) Appl. No.: 13/516,444

(22) PCT Filed: Sep. 22, 2010

(86) PCT No.: PCT/JP2010/066343
§ 371 (c)(1),
(2), (4) Date: Jun. 15, 2012

(87) PCT Pub. No.: WO2011/074298
PCT Pub. Date: Jun. 23, 2011

(65) Prior Publication Data
US 2012/0257511 A1 Oct. 11, 2012

(30) Foreign Application Priority Data

Dec. 18, 2009 (JP) .................................. 2009-287805

(51) Int. Cl.
*H04L 12/26* (2006.01)
*H04B 17/02* (2006.01)

(52) U.S. Cl.
USPC .......................................... 370/242; 375/211

(58) Field of Classification Search
CPC combination set(s) only.
See application file for complete search history.

(56) References Cited

U.S. PATENT DOCUMENTS

| 6,804,218 B2 | 10/2004 | El-Maleh et al. |
| 7,298,694 B2 | 11/2007 | Kamiya et al. |
| 7,590,096 B2 | 9/2009 | El-Maleh et al. |
| 7,881,338 B2 | 2/2011 | Damola et al. |
| 8,243,695 B2 | 8/2012 | El-Maleh et al. |

(Continued)

FOREIGN PATENT DOCUMENTS

| CN | 1486554 | 3/2004 |
| CN | 101072360 | 11/2007 |
| JP | 59-226536 | 12/1984 |
| JP | 2-112348 | 4/1990 |
| JP | 2000-316034 | 11/2000 |

(Continued)

OTHER PUBLICATIONS

Munemitsu Kuwabara et al., "Bosai Musen System ni Okeru IP Tsushin no Ichi Kento", 2004 IEICE Communications Society Conference Koen Ronbunshu 1, Sep. 8, 2004, p. 508.

(Continued)

*Primary Examiner* — Clemence Han
(74) *Attorney, Agent, or Firm* — Young & Thompson

(57) ABSTRACT

Disclosed is a determination device provided with: a determination unit for determining whether or not a received frame is a predetermined specific frame; an error detection unit for detecting errors in relation to the frame; a disposal unit for disposing of the frame when an error is detected in relation to the frame and the frame is not the specific frame; and a rewriting unit for rewriting code for detecting errors in relation to the specific frame, in accordance with the state of the current frame.

8 Claims, 7 Drawing Sheets

(56) References Cited

U.S. PATENT DOCUMENTS

| | | | |
|---|---|---|---|
| 2002/0090007 A1 | 7/2002 | Kamiya et al. | |
| 2006/0190610 A1 | 8/2006 | Motegi et al. | |
| 2011/0085585 A1* | 4/2011 | Matsumoto et al. | 375/211 |
| 2011/0182187 A1* | 7/2011 | Jeong et al. | 370/242 |
| 2011/0317746 A1* | 12/2011 | Aoki et al. | 375/213 |
| 2012/0281549 A1* | 11/2012 | Yu et al. | 370/242 |

FOREIGN PATENT DOCUMENTS

| | | |
|---|---|---|
| JP | 2001-27488 | 1/2001 |
| JP | 2002-185550 | 6/2002 |
| JP | 2002-199042 | 7/2002 |
| JP | 2006-217085 | 8/2006 |
| JP | 2009-512377 | 3/2009 |

OTHER PUBLICATIONS

International Search Report PCT/JP2010/066343 dated Dec. 14, 2010.

Japanese Official Action—2011-546007—Sep. 17, 2013 (partial translation).

Chinese Official Action, 201080056766.1, Mar. 31, 2014.

Japanese Official Action—2011-546007—Mar. 25, 2014.

* cited by examiner

DETERMINATION DEVICE, TRANSMISSION DEVICE, DETERMINATION METHOD, AND COMPUTER PROGRAM

TECHNICAL FIELD

The present invention relates to technology of transmitting frames in a packet network.

BACKGROUND ART

There is technology of transmitting a signal transmitted using digital hierarchy technology such as PDH (Plesiochronous Digital Hierarchy), SDH (Synchronous Digital Hierarchy) or SONET (Synchronous Optical NETwork) (hereinafter referred to as "digital hierarchy signal"), via a packet network. When the digital hierarchy signal is input to the packet network, the digital hierarchy signal is converted into frames and transmitted as individual frames in the packet network. Also, when the individual frames are output from the packet network, the frames are converted into the digital hierarchy signal through signal extraction.

Further, in a conventional packet network, error detection is performed in each relay device. When a single transmission error is detected from a frame, the frame is discarded. This is because the packet network is designed for a computer and is intended to prevent a band from being unnecessarily consumed by immediately discarding the frame containing the error. However, when data requiring a real-time property is a transmission target, the data may need to be directly transmitted to a destination without retransmission even in a state in which an error is contained. For example, technology of directly transmitting data even when a bit error is generated, as shown in Patent Document 1, has been proposed.

FIG. 7 is a schematic diagram showing a problem generated when a digital hierarchy signal is transmitted via a packet network. In FIG. 7, a PDH signal is illustrated as a concrete example of the digital hierarchy signal. When the PDH signal is input to the packet network, the PDH signal is converted into a frame, and a plurality of frames are generated. In an example of FIG. 7, a 1-bit error is generated in one of the plurality of frames in transmission in the packet network. In this case, when error detection such as FCS (Frame Check Sequence) is performed in the packet network and an error is detected, a frame from which the error has been detected is discarded. Accordingly, the entire PDH signal contained in the discarded frame is discarded and, for example, a burst error of hundreds of bits or more is generated.

DOCUMENTS OF THE PRIOR ART

Patent Documents

[Patent Document 1] Japanese Unexamined Patent Application, First Application No. 2000-316034

DISCLOSURE OF THE INVENTION

Problem to be Solved by the Invention

However, the above technology has problems in that it is necessary to add a special flag called an FCS error frame discard control flag, and the technology fails to cope with and discards a frame generated by a general device that does not correspond to the flag.

In view of the circumstances described above, an object of an aspect of the present invention is to provide technology capable of suppressing generation of a burst error when a frame is transmitted in a packet network.

Means for Solving the Problem

According to an aspect of the present invention, a determination device includes a determination unit which determines whether a received frame is a prescribed specific frame; an error detection unit which detects an error for the frame; a discard unit which discards a frame from which the error has been detected and that is not the specific frame; and a rewriting unit which rewrites a code for detection of an error for the specific frame based on a current frame state.

According to an aspect of the present invention, a transmission device includes a receiving unit which receives frames; a determination unit which determines whether the received frame is a prescribed specific frame; an error detection unit which detects an error for the frame; a discard unit which discards a frame from which the error has been detected and that is not the specific frame; a rewriting unit which rewrites a code for detection of an error for the specific frame based on a current frame state; and a transmission unit which transmits the frame rewritten by the rewriting unit and a frame from which the error has not been detected by the error detection unit to another device.

According to an aspect of the present invention, a determination method includes determining, by a determination device, whether a received frame is a prescribed specific frame; detecting, by the determination device, an error for the frame; discarding, by the determination device, a frame from which the error has been detected and that is not the specific frame; and rewriting, by the determination device, a code for detection of an error for the specific frame based on a current frame state.

According to an aspect of the present invention, a computer program causes a computer to execute: determining whether a received frame is a prescribed specific frame; detecting an error for the frame; discarding a frame from which the error has been detected and that is not the specific frame; and rewriting a code for detection of an error for the specific frame based on a current frame state.

Effect of the Invention

According to an aspect of the present invention, it is possible to suppress the generation of the burst error when a frame is transmitted in the packet network.

EMBODIMENTS FOR CARRYING OUT THE INVENTION

Figure 1:
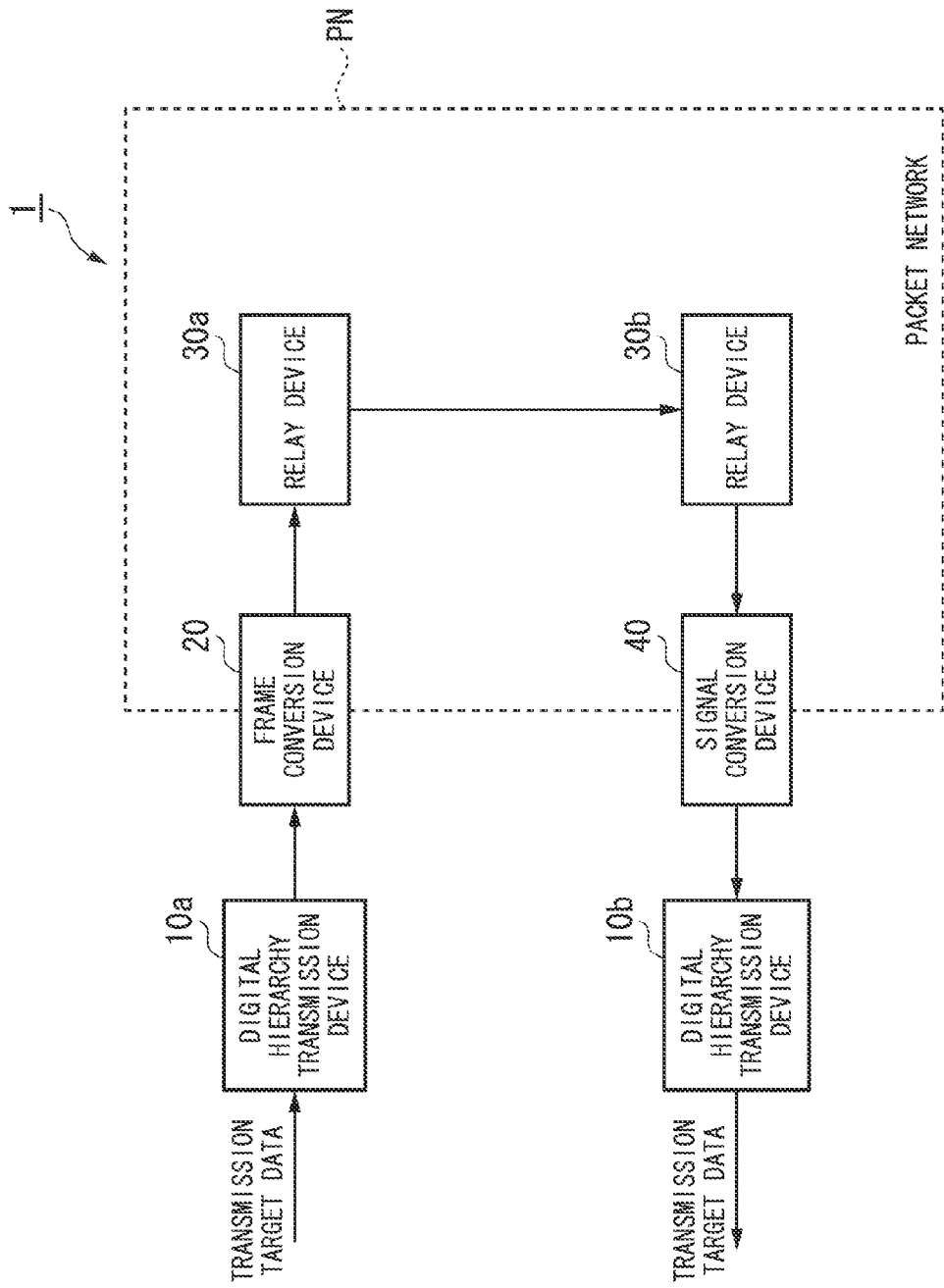
FIG. 1 is a system configuration diagram showing a system configuration of a transmission system.

FIG. 1 is a system configuration diagram showing a system configuration of a transmission system 1. The transmission system 1 is a system including a packet network PN, and includes a digital hierarchy transmission device 10 (10a and 10B), a frame conversion device 20, a relay device 30 (30a and 30B), and a signal conversion device 40. The packet network PN is a network including a plurality of relay devices 30. In the packet network PN, data transmission is performed in units of frames in layer 2 (L2).

Figure 2:
FIG. 2 is a diagram showing a schematic structure of a general Ethernet (registered trademark) frame.

FIG. 2 is a diagram showing a schematic structure of a general Ethernet (registered trademark) frame. A frame transmitted in the packet network PN has the structure shown in FIG. 2. That is, the frame transmitted in the packet network PN has values of fields: a destination MAC address 51, a transmission source MAC address 52, a VLAN 53, an Ethernet (registered trademark) Type 54, an IP header 55, a TCP/UDP header 56, a payload 57, a padding 58, and an FCS 59. However, the values of the fields of the VLAN 53, the IP header 55, the TCP/UDP header 56, and the padding 58 are not essential.

Next, the respective devices included in the transmission system 1 will be described.

The digital hierarchy transmission device 10 is a device that performs data transmission using digital hierarchy technology, such as PDH (Plesiochronous Digital Hierarchy), SDH (Synchronous Digital Hierarchy) or SONET (Synchronous Optical NETwork), and is installed in a digital hierarchy transmission network. The digital hierarchy transmission device 10 refers to, for example, a device such as a Node B (Base Transceiver Station: BTS) in a mobile phone communication network. In the following description, a signal transmitted by the digital hierarchy transmission device 10 is referred to as a "digital hierarchy signal."

The digital hierarchy transmission device 10 converts input transmission target data (hereinafter referred to as a "transmission target data") into a digital hierarchy signal and transmits the digital hierarchy signal to another device. In the case of FIG. 1, the digital hierarchy transmission device 10a receives the transmission target data from another information processing device, converts the transmission target data into a digital hierarchy signal, and transmits the digital hierarchy signal to the digital hierarchy transmission device 10b via the packet network PN. When the digital hierarchy transmission device 10b receives the digital hierarchy signal from the digital hierarchy transmission device 10a via the packet network PN, the digital hierarchy transmission device 10b converts the received signal to transmission target data. Also, the digital hierarchy transmission device 10b transmits the transmission target data to another information processing device that is a transmission destination of the transmission target data.

In FIG. 1, only the two digital hierarchy transmission devices 10a and 10B are shown as the digital hierarchy transmission devices 10. However, the transmission system 1 may include more digital hierarchy transmission devices 10. Also, the digital hierarchy transmission devices 10 may be installed so that they can communicate with each other. In this case, the digital hierarchy transmission devices 10 perform digital hierarchy signal transmission to each other, and the digital hierarchy transmission device 10 located at a boundary of the packet network PN performs communication with the frame conversion device 20 or the signal conversion device 40. In FIG. 1, only the digital hierarchy transmission devices 10 are also shown to be connected to the packet network PN. However, other communication devices inputting different signals from the digital hierarchy signal to the packet network PN are also connected to the packet network PN. Thus, frames other than the frame converted from the digital hierarchy signal are transmitted in the packet network PN.

The frame conversion device 20 is installed at a boundary between the packet network PN and the digital hierarchy transmission network, and receives the digital hierarchy signal from the digital hierarchy transmission device 10. Also, the frame conversion device 20 converts the received digital hierarchy signal into a frame according to the packet network PN, and transmits the frame to the relay device 30 in the packet network PN (the relay device 30a in FIG. 1). The frame conversion device 20 performs, for example, conversion based on PWE3 (Pseudo Wire Emulation Edge to Edge).

The relay device 30 is a communication device installed in the packet network PN. The relay device 30 transmits the input frame to another device according to a destination defined in a frame header. The relay device 30, for example, may be a wireless communication device using microwaves or may be a wired communication device.

The signal conversion device 40 is installed at the boundary between the packet network PN and the digital hierarchy transmission network, and receives the frame transmitted in the packet network PN from the relay device 30. Also, the signal conversion device 40 converts the received frame to a digital hierarchy signal and transmits the digital hierarchy signal to the digital hierarchy transmission device 10 (the digital hierarchy transmission device 10b in FIG. 1) in the digital hierarchy transmission network. The signal conversion device 40 performs, for example, conversion based on PWE3.

Next, a configuration of the relay device 30 will be described in detail. Since the configuration of the relay device 30 includes a first embodiment and a second embodiment, respective configurations will be described hereinafter.

First Embodiment

Figure 3:
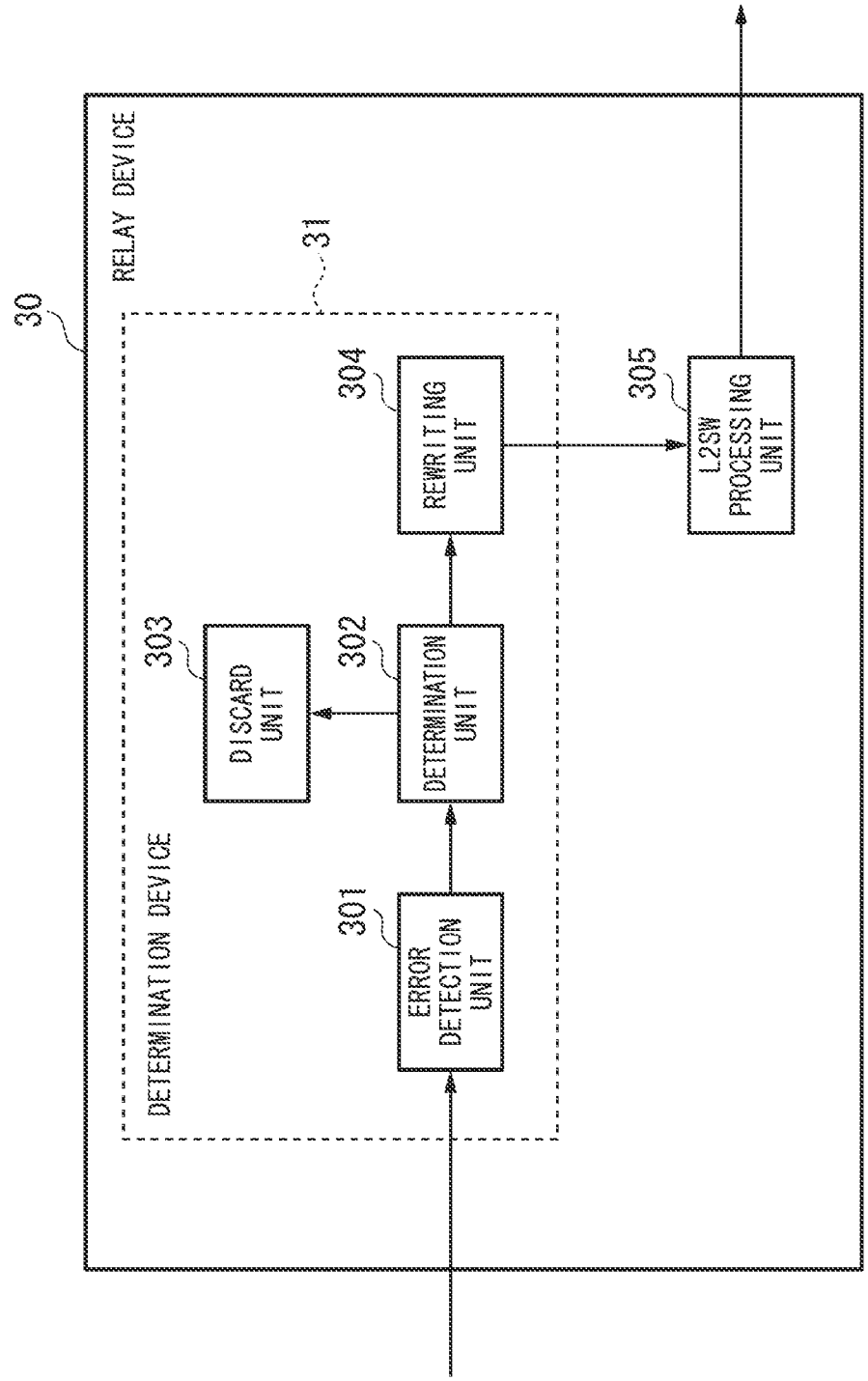
FIG. 3 is a schematic block diagram showing a functional configuration of a relay device in a first embodiment.

FIG. 3 is a schematic block diagram showing a functional configuration of the relay device 30 in the first embodiment. The relay device 30 in the first embodiment includes a CPU (Central Processing Unit), a memory, a subsidiary storage device, and the like that are connected via a bus. The relay device 30 in the first embodiment functions as a device including an error detection unit 301, a determination unit 302, a discard unit 303, a rewriting unit 304, and an L2SW processing unit 305 by executing a relay program (a communication program). Also, all or some functions of the relay device 30 in the first embodiment may be realized using hardware such as ASIC (Application Specific Integrated Circuit), PLD (Programmable Logic Device) or FPGA (Field Programmable Gate Array). Alternatively, the relay device 30 may be realized by a computer reading and executing a relay program recorded in a computer-readable recording medium. The computer-readable recording medium is, for example, a storage device, such as a portable medium such as a flexible disk, a magneto optical disc, a ROM or a CD-ROM, or a hard disk embedded in a computer system.

The error detection unit 301 receives frames, which are transmitted to the own device (the relay device 30), and detects an error from each received frame. In this case, it is understood that an error is not detected from the frame having no error. Thus, the error detection unit 301 has at least a function of a receiving unit and a function of an error detection unit. An error detection and correction code (hereinafter referred to as "detection code") is added to the frame transmitted in the packet network PN in advance. The error detection and correction code, for example, is added by the frame conversion device 20. The error detection unit 301 detects an error from each frame based on the error detection and correction code.

The error detection and correction code may be a code (e.g., a parity code, a checksum, or an FCS (Frame Check Sequence)) for simply detecting a bit error generated in the frame or may be a code (e.g., a Hamming code or a BCH code) for correcting an error when the error is detected. The error detection unit 301 adds an error flag to the frame from which the error has been detected, and transmits the resultant frame to the determination unit 302. On the other hand, the error detection unit 301 transmits the frame from which the error has not been detected to the determination unit 302 without adding the error flag.

The determination unit 302 determines whether the error flag has been added to each frame received from the error detection unit 301. Also, the determination unit 302 determines whether the frame having the error flag added thereto is a specific frame. The specific frame is a frame of data that is set in advance to be transmitted without being discarded in the transmission system 1. In the present embodiment, the specific frame is a frame generated from the digital hierarchy signal. Also, the data set in advance to be transmitted without being discarded in the transmission system 1 is, for example, data having a high real-time property. More specifically, the data is, for example, audio data or video data.

The determination unit 302 determines whether each frame is the specific frame based on whether a predetermined field of the frame has a previously set value (hereinafter referred to as a "set value"). The predetermined field refers to a field determined in advance in existing protocol, such as the destination MAC address 51, the VLAN 53, the Ethernet (registered trademark) Type 54 or the like. In such a predetermined field, if the value of the frame is coincident with the set value, the determination unit 302 determines that the frame is the specific frame. More specifically, for example, the determination unit 302 may reference a value of the field of the VLAN 53 and determine that a frame for traffic belonging to a specific value (number) is the specific frame.

The determination unit 302 transmits the frame to which the error flag has been added and that is not the specific frame to the discard unit 303. Also, the determination unit 302 transmits the frame to which the error flag has not been added or the specific frame to the rewriting unit 304. In this case, the determination unit 302 adds a detection code rewriting flag to the specific frame to which the error flag has been added. Also, the determination unit 302 has an indication of the predetermined field to be referenced and the set value of the predetermined field that are stored in advance.

The discard unit 303 discards the frame received from the determination unit 302. That is, the discard unit 303 discards the frame to which the error flag has been added and that is not the specific frame.

The rewriting unit 304 performs rewriting of the detection code on the frame having the detection code rewriting flag among the frames received from the determination unit 302. Specifically, the rewriting unit 304 recalculates a detection code for the frame having the detection code rewriting flag using the same scheme as the detection code added to the frame based on a current bit sequence. The rewriting unit 304 rewrites the current detection code with the newly calculated detection code. Accordingly, even when the rewritten frame actually contains the error, the error is not detected based only on the detection code since the bit sequence corresponds to the detection code. Also, the rewriting unit 304 transmits the frame having no detection code rewriting flag among the frames received from the determination unit 302 to the L2SW processing unit 305 without rewriting the current detection code.

The L2SW processing unit 305 performs an L2SW (layer 2 switch) process on the frame received from the rewriting unit 304, and transmits the resultant frame to another device that is a destination of the frame. Thus, the L2SW processing unit 305 at least functions as a transmission unit.

Figure 4:
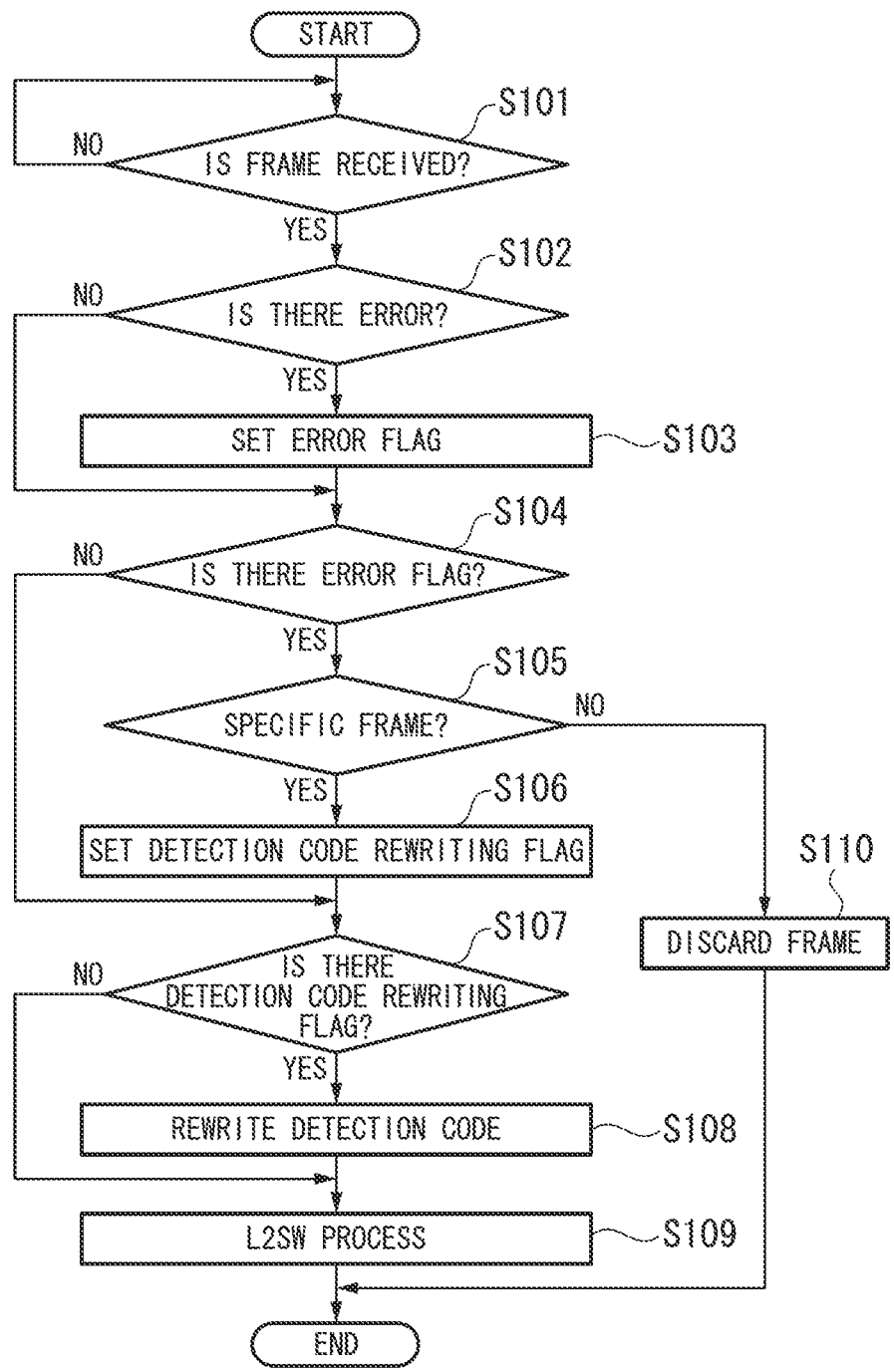
FIG. 4 is a flowchart showing a flow of operation of the relay device in the first embodiment.

FIG. 4 is a flowchart showing a flow of operation of the relay device 30 in the first embodiment. First, the error detection unit 301 of the relay device 30 waits to receive a new frame (step S101—NO). When the error detection unit 301 receives the frame (step S101—YES), the error detection unit 301 attempts to detect an error from the received frame (step S102). If the error has been detected (step S102—YES), the error detection unit 301 sets an error flag for the frame from which the error has been detected (step S103), and transmits the resultant frame to the determination unit 302. On the other hand, if the error has not been detected (step S102—NO), the error detection unit 301 transmits the frame to the determination unit 302 without setting the error flag.

The determination unit 302 determines whether the error flag has been set for the frame received from the error detection unit 301 (step S104). If the error flag has not been set (step S104—YES), the determination unit 302 also determines whether the frame is the specific frame (step S105). If the received frame is the specific frame in which the error flag has been set (step S105—YES), the determination unit 302 sets the detection code rewriting flag for the frame (step S106) and transmits the resultant frame to the rewriting unit 304.

On the other hand, if the received frame is not the specific frame and the error flag has been set in the frame (step S105—NO), the determination unit 302 transmits the frame to the discard unit 303. In this case, the discard unit 303 discards the frame received from the determination unit 302 (step S110).

Further, if the received frame is a frame in which the error flag has not been set in step S104 (step S104—NO), the determination unit 302 transmits the frame to the rewriting unit 304 without setting the detection code rewriting flag.

The rewriting unit 304 determines whether the detection code rewriting flag has been set in the frame received from the determination unit 302 (step S107). If the detection code rewriting flag has been set (step S107—YES), the rewriting unit 304 newly calculates a detection code based on a current bit sequence, and rewrites the original detection code with the calculated value (step S108). Also, the rewriting unit 304 transmits the rewritten frame to the L2SW processing unit 305. On the other hand, if the detection code rewriting flag has not been set in the frame in step S107 (step S107—NO), the rewriting unit 304 transmits the received frame to the L2SW processing unit 305 without rewriting the original detection code.

The L2SW processing unit 305 performs an L2SW process on the frame received from the rewriting unit 304 and transmits the resultant frame to another device that is a subsequent stage (step S109). Then, the transmission process in the relay device 30 in the first embodiment ends.

According to the transmission system 1 including the relay device 30 of the first embodiment configured as described above, the frame converted from the digital hierarchy signal (the specific frame) is transmitted without being discarded even when an error is generated in the packet network PN. Accordingly, it is possible to prevent bits of a part in which an error has not been generated from being discarded and suppress a burst error from being generated in the digital hierarchy signal.

Further, since the detection code is newly added to the specific frame in which the error has been generated based on a bit sequence in a state in which the error has been generated, the error is not detected in the subsequent relay device 30. If the relay device 30 is configured not to determine whether the frame in which the error has not been generated is the specific frame, the error is not detected by the relay device 30 after the detection code is rewritten such that the frame can be transmitted without being subjected to the determination as to whether the frame is the specific frame. Accordingly, it is possible to achieve a high-speed transmission process in the relay device 30.

Furthermore, since the determination of the specific frame is made based on the value of the field defined in existing protocol, it is possible to determine the specific frame without adding a special flag to the frame and suppress generation of the burst error.

Second Embodiment

Figure 5:
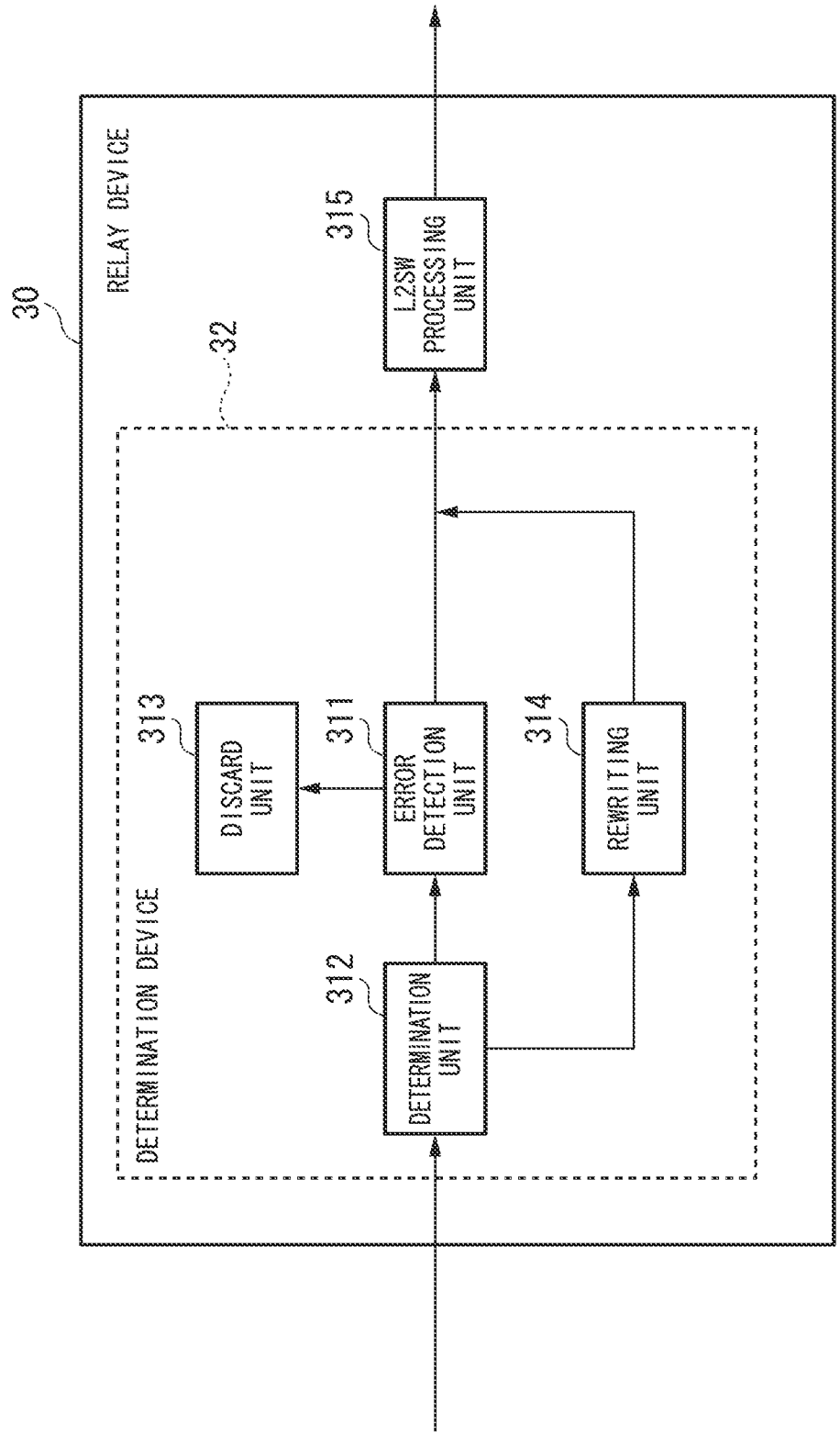
FIG. 5 is a schematic block diagram showing a functional configuration of a relay device in a second embodiment.

FIG. 5 is a schematic block diagram showing a functional configuration of a relay device 30 in a second embodiment. The relay device 30 in the second embodiment includes a CPU, a memory, a subsidiary storage device and the like that are connected via a bus. The relay device 30 in the second embodiment functions as a device including an error detection unit 311, a determination unit 312, a discard unit 313, a rewriting unit 314, and an L2SW processing unit 315 by executing a relay program (a communication program). Further, all or some of the functions of the relay device 30 in the second embodiment may be realized using hardware such as ASIC, PLD or FPGA. Alternatively, the relay device 30 in the second embodiment may be realized by a computer reading and executing a relay program recorded in a computer-readable recording medium. The computer-readable recording medium refers to, for example, a storage device, such as a portable medium such as a flexible disk, a magneto optical disc, a ROM or a CD-ROM, or a hard disk embedded in a computer system.

The determination unit 312 receives a frame, which is transmitted to its own device (the relay device 30), and determines whether the received frame is the specific frame. A process of determining whether the received frame is the specific frame is the same as that in the determination unit 302 in the first embodiment. The determination unit 312 transmits frames other than the specific frame to the error detection unit 311. Also, the determination unit 312 transmits the specific frame to the rewriting unit 314.

The error detection unit 311 detects an error from each frame received from the determination unit 312. A process in which the error detection unit 311 detects the error is the same as that in the error detection unit 301 in the first embodiment. The error detection unit 311 transmits a frame from which the error has been detected to the discard unit 313. On the other hand, the error detection unit 311 transmits a frame from which the error has not been detected to the L2SW processing unit 315.

The discard unit 313 discards the frame received from the error detection unit 311. That is, the discard unit 313 discards a frame which is not the specific frame and from which the error has been detected.

The rewriting unit 314 performs rewriting of a detection code on the specific frame received from the determination unit 312. Specifically, the rewriting unit 314 recalculates a detection code using the same scheme as the detection code added to the frame based on a current bit sequence irrespective of whether the specific frame contains an error, and rewrites a current detection code with the newly calculated detection code. Accordingly, even when the rewritten frame actually contains the error, the error is not detected based only on the detection code since the bit sequence corresponds to the detection code.

The L2SW processing unit 315 has the same configuration as the L2SW processing unit 305 in the first embodiment.

Figure 6:
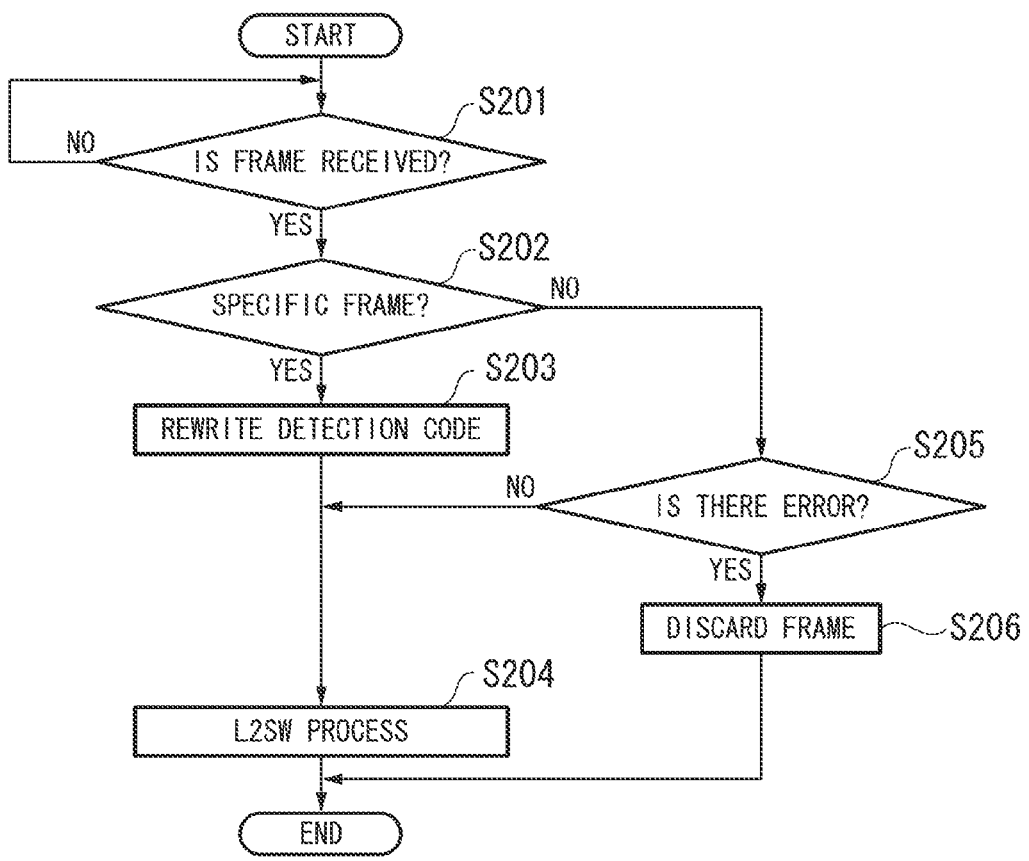
FIG. 6 is a flowchart showing a flow of operation of the relay device in the second embodiment.
Figure 7:
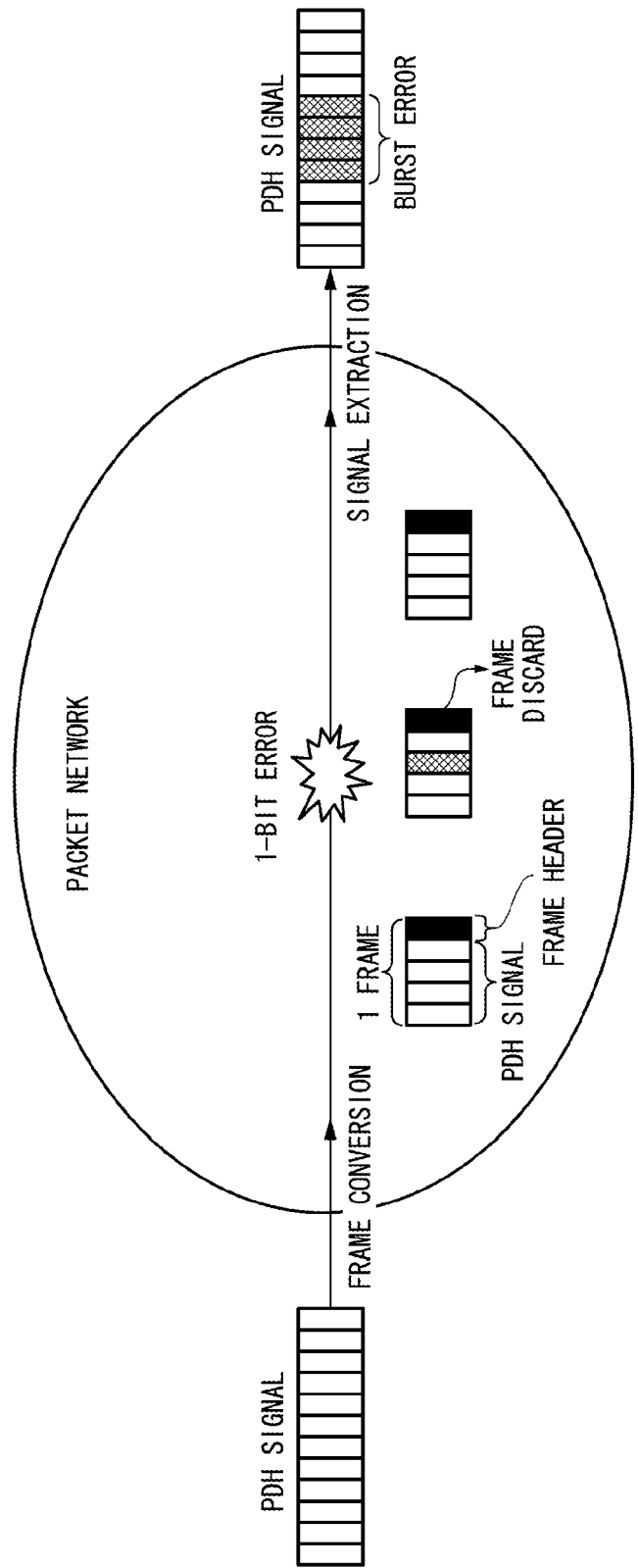
FIG. 7 is a schematic diagram showing a problem generated when a digital hierarchy signal is transmitted via a packet network.

FIG. 6 is a flowchart showing a flow of operation of the relay device 30 in the second embodiment. First, the determination unit 312 of the relay device 30 waits to receive a new frame (step S201—NO). When the determination unit 312 receives the frame (step S201—YES), the determination unit 312 determines whether the received frame is the specific frame (step S202). If the received frame is the specific frame (step S202—YES), the determination unit 312 transmits the specific frame to the rewriting unit 314.

The rewriting unit 314 newly calculates the detection code based on a current bit sequence of the specific frame received from the determination unit 312 and rewrites an original detection code with the calculated value (step S203). Also, the rewriting unit 314 transmits the written specific frame to the L2SW processing unit 315.

On the other hand, if it is determined in step S202 that the frame is not the specific frame (step S202—NO), the determination unit 312 transmits the frame to the error detection unit 311. The error detection unit 311 attempts to detect an error from the frame received from the determination unit 312 (step S205), When the error is detected (step S205—YES), the error detection unit 311 transmits the frame from which the error has been detected to the discard unit 313. In this case, the discard unit 313 discards the frame received from the error detection unit 311 (step S206). On the other hand, if the error has not been detected (step S205—NO), the error detection unit 311 transmits the frame to the L2SW processing unit 315.

The L2SW processing unit 315 performs an L2SW process on the frame received from the error detection unit 311 or the rewriting unit 314 and transmits the resultant frame to another device that is a subsequent stage (step S204). Then, the transmission process in the relay device 30 in the second embodiment ends.

According to the transmission system 1 including the relay device 30 of the second embodiment configured as described above, even when an error is generated in the frame converted from the digital hierarchy signal (the specific frame) in the packet network PN, the frame is transmitted without being discarded on the way. Thus, it is possible to prevent bits of a part in which an error has not been generated from being discarded and suppress the burst error from being generated in the digital hierarchy signal.

Further, in the relay device 30 of the second embodiment, the specific frame determination in the determination unit 312 is made in a preceding stage of the error detection process in the error detection unit 311. Also, specific frames are not subjected to the error detection in the error detection unit 311, but all the specific frames become targets of the detection code rewriting process. Thus, it is possible to achieve a high-speed transmission process in the relay device 30 by omitting the error detection process for the specific frame. Also, for configurations of the error detection unit 311, the discard unit 313, and the L2SW processing unit 315, configurations used for a general relay device in related art are available.

<Variant>

In any of the first embodiment and the second embodiment, the frame conversion device 20 may be integral with the relay device 30. Similarly, the signal conversion device 40 may be integral with the relay device 30. Similarly, the frame conversion device 20 and the signal conversion device 40 may be integral with the relay device 30.

Further, the function of the discard unit 303 in the first embodiment may be included in the determination unit 302. Also, the function of the discard unit 313 in the second embodiment may be included in the error detection unit 311. In this case, the determination unit 302 and the error detection unit 311 execute discarding of frames.

Further, the relay device 30 in the first embodiment may include the determination device 31 including the error detection unit 301, the determination unit 302, the discard unit 303 and the rewriting unit 304, and the L2SW processing unit 305, as separate devices. Similarly, the relay device 30 in the second embodiment may include the determination device 32 including the error detection unit 311, the determination unit 312, the discard unit 313 and the rewriting unit 314, and the L2SW processing unit 315, as separate devices.

Further, the structure of the frame transmitted in the packet network PN is not limited to that shown in FIG. 2 and the frame may be any frame to which the error detection and correction code is added. Further, a unit of data transmitted in the packet network PN (PDU: Protocol Data Unit) is not limited to a layer 2 frame, and any PDU such as a packet or a cell may be transmitted as long as the PDU is a PDU to which the error detection and correction code is added, as described above. In this case, the frame conversion device 20, the L2SW processing unit of the relay device 30, and the signal conversion device 40 are appropriately designed according to the transmitted PDU.

While the embodiments of the present invention have been described above with reference to the drawings, a concrete configuration is not limited to the embodiments and, for example, designs without departing from the scope and spirit of the present invention fall within the present invention.

Priority is claimed on Japanese Patent Application No. 2009-287805, filed on Dec. 18, 2009, the contents of which are incorporated herein by reference.

INDUSTRIAL APPLICABILITY

According to an aspect of the present invention, it is possible to suppress generation of a burst error when a frame is transmitted in the packet network.

REFERENCE SYMBOLS

1 . . . transmission system
10 . . . digital hierarchy transmission device
20 . . . frame conversion device
30 . . . relay device (transmission device)
40 . . . signal conversion device
301 . . . error detection unit
302 . . . determination unit
303 . . . discard unit
304 . . . rewriting unit
305 . . . L2SW processing unit
311 . . . error detection unit
312 . . . determination unit
313 . . . discard unit
314 . . . rewriting unit
315 . . . L2SW processing unit

The invention claimed is:

1. A determination device comprising:
a determination unit which determines whether a received frame is a prescribed specific frame;
an error detection unit which detects an error for the frame;
a discard unit which discards a frame from which the error has been detected and that is not the specific frame; and
a rewriting unit which rewrites a code for detection of an error for the specific frame based on a current frame state.

2. The determination device according to claim 1, wherein:
the determination unit performs said determination as to whether the received frame is the prescribed specific frame on only a frame from which the error has been detected by the error detection unit.

3. The determination device according to claim 1, wherein:
the rewriting unit performs rewriting on the specific frame irrespective of whether the error has been detected.

4. The determination device according to claim 3, wherein:
the determination unit transmits a specific frame of received frames to the rewriting unit and transmits frames other than the specific frame to the error detection unit.

5. The determination device according to claim 1, wherein:
the determination unit transmits a specific frame of received frames to the rewriting unit and transmits frames other than the specific frame to the error detection unit.

6. A transmission device comprising:
a receiving unit which receives frames;
a determination unit which determines whether the received frame is a prescribed specific frame;
an error detection unit which detects an error for the frame;
a discard unit which discards a frame from which the error has been detected and that is not the specific frame;
a rewriting unit which rewrites a code for detection of an error for the specific frame based on a current frame state; and
a transmission unit which transmits the frame rewritten by the rewriting unit and a frame from which the error has not been detected by the error detection unit to another device.

7. A determination method comprising:
determining, by a determination device, whether a received frame is a prescribed specific frame;
detecting, by the determination device, an error for the frame;
discarding, by the determination device, a frame from which the error has been detected and that is not the specific frame; and
rewriting, by the determination device, a code for detection of an error for the specific frame based on a current frame state.

8. A non-transitory computer-readable recording medium in which a computer program is recorded, the computer program causes a computer to execute:
determining whether a received frame is a prescribed specific frame;
detecting an error for the frame;
discarding a frame from which the error has been detected and that is not the specific frame; and
rewriting a code for detection of an error for the specific frame based on a current frame state.

* * * * *